United States Patent
Bertsch et al.

(10) Patent No.: US 7,845,546 B2
(45) Date of Patent: Dec. 7, 2010

(54) METHOD FOR PRODUCING A VACUUM MEASURING CELL OF THE MEMBRANE TYPE

(75) Inventors: Dietmar Bertsch, Dornbirn (AT); Klaus Dietrich, Dornbirn (AT); Nico Onda, Knonau (CH); Martin Wüest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 12/531,424

(22) PCT Filed: Mar. 25, 2008

(86) PCT No.: PCT/CH2008/000132

§ 371 (c)(1),
(2), (4) Date: Jan. 26, 2010

(87) PCT Pub. No.: WO2008/122134

PCT Pub. Date: Oct. 16, 2008

(65) Prior Publication Data

US 2010/0146771 A1    Jun. 17, 2010

(30) Foreign Application Priority Data

Apr. 7, 2007    (CH) .................................... 0577/07

(51) Int. Cl.
*B23K 31/02*    (2006.01)
(52) U.S. Cl. ................... 228/121; 228/220; 228/233.2; 228/245
(58) Field of Classification Search ....................... None
See application file for complete search history.

(56) References Cited

U.S. PATENT DOCUMENTS

| 3,736,222 | A | | 5/1973 | Arendt |
| 4,241,148 | A | * | 12/1980 | Schoer et al. ............... 428/654 |
| 4,807,796 | A | * | 2/1989 | Liehr .......................... 228/121 |
| 5,333,776 | A | * | 8/1994 | Garg et al. ................... 228/219 |
| 5,534,357 | A | * | 7/1996 | Nonoyama et al. .......... 428/629 |
| 5,556,596 | A | * | 9/1996 | Hayashi et al. ............... 422/53 |
| 5,858,899 | A | * | 1/1999 | Otsuka et al. ............... 501/127 |
| 5,954,900 | A | | 9/1999 | Hegner |

(Continued)

FOREIGN PATENT DOCUMENTS

EP    1 167 938 A2    1/2002

(Continued)

*Primary Examiner*—Kiley Stoner
(74) *Attorney, Agent, or Firm*—Nataro, Michalos & Zaccaria P.C.

(57) ABSTRACT

Method for producing a vacuum measuring cell having a pressure transducer diaphragm with housing plates sealed on opposite sides to form reference and measuring vacuum chambers. An opening in one plate communicates with the measuring vacuum chamber and has a sealed connection for joining to medium to be measured. The diaphragm and plates are aluminum oxide ceramic and at least one of the seals is aluminum with a thickness of 0.5 μm to 30 μm. The ceramic parts are pressed together at increased temperature of 600° C. to 680° C. in a process gas atmosphere including a reducing gas, during a time of 30 to 90 minutes, and subsequently a tempering step is carried out in a second process gas atmosphere including oxygen, tempering taking place at a temperature of 450° C. to 575° C. such that the metallic aluminum is oxidized into aluminum oxide.

30 Claims, 2 Drawing Sheets

U.S. PATENT DOCUMENTS

| | | | |
|---|---|---|---|
| 6,306,315 B1 * | 10/2001 | Ogata et al. | 252/518.1 |
| 6,306,516 B1 * | 10/2001 | Jin et al. | 428/469 |
| 2003/0150563 A1 * | 8/2003 | Kuibara et al. | 156/345.51 |
| 2004/0040382 A1 * | 3/2004 | Peterson et al. | 73/708 |
| 2004/0238605 A1 * | 12/2004 | Nishimura et al. | 228/264 |
| 2006/0075823 A1 | 4/2006 | Grudzien | |
| 2006/0081682 A1 * | 4/2006 | Doko et al. | 228/101 |
| 2007/0089524 A1 * | 4/2007 | Walchli et al. | 73/718 |
| 2008/0062611 A1 * | 3/2008 | Himori et al. | 361/234 |

FOREIGN PATENT DOCUMENTS

| | | |
|---|---|---|
| WO | WO 2007/019714 A | 2/2007 |

* cited by examiner

METHOD FOR PRODUCING A VACUUM MEASURING CELL OF THE MEMBRANE TYPE

FIELD AND BACKGROUND OF THE INVENTION

The invention relates to a method for the production of a vacuum measuring cell with a diaphragm.

It is known to measure pressures or pressure differences thereby that a thin diaphragm is pressurized and its deflection measured. A known and suitable method for measuring the deflection of such diaphragms comprises implementing the diaphragm arrangement as a variable electric capacitor, wherein, via measuring electronic circuitry, the capacitance change, which correlates with the pressure change, is evaluated in known manner. The capacitor is implemented by disposing the thin flexible diaphragm surface at a short distance opposite a further surface and coating both opposing surfaces with an electrically conducting coating or implementing them of electrically conductive material. Due to the deflection, the distance between the two electrodes changes upon pressurization of the diaphragm leading to a capacitance change of the arrangement which can be evaluated. Sensors of this type are produced of silicon in large production numbers. The areal base body as well as also the diaphragm are herein often entirely comprised of silicon material. There are also designs with combined material composition, for example silicon with glass base. The sensors can thereby be produced cost-effectively. As a rule, pressure sensors of this type are only applicable for relatively high pressure ranges of approximately $10^{-1}$ mbar to a few bars. High resolution at lower pressures starting at approximately $10^{-1}$ mbar are no longer realizable using the material silicon. Sensors of this type are not suitable for typical vacuum applications. The reason is inter alia that the silicon on the surface reacts with the environment and the sensitive sensor characteristic is thus disturbed. Water vapor contained in normal atmospheric air already leads to corresponding reactions on the surfaces. The problem is additionally exacerbated if the sensor is employed in chemically aggressive atmospheres, which is increasingly common in current reactive vacuum plasma processes. Attempts have therefore been made to protect such silicon sensors by passivating the surfaces against aggressive external actions. Attempts have also been made to provide the surface with a protective coating in order to increase the durability and resistance against the chemically aggressive environment, as has been described in DE 41 36 987 A1. Such measures are difficult to realize and, in the case of mechanically deformable parts, such as diaphragms, only yield limited success, in particular in the presence of especially aggressive media, such as fluorine, bromic acid and their compounds, as are utilized in the semiconductor industry, for example in vacuum etching processes.

It has therefore been proposed to produce measuring cells for vacuum pressure measurements of corrosion-resistant materials such as $Al_2O_3$. EP 1 070 239 B1 describes a capacitive vacuum measuring cell which is substantially completely built of ceramic and, consequently, is to a high degree corrosion-resistant. To be able to measure very low pressures up to $10^{-6}$ mbar with high accuracy, a very thin ceramic diaphragm of <250 μm thickness is utilized, which is disposed free of tension and substantially symmetrically in a ceramic housing. Although this diaphragm-based vacuum measuring cell is very successful in operation and represents a significant advance with respect to corrosion resistance, it was found that the joining regions between diaphragm and housing as well as the joining region for the connection fitting and, if applicable, the connection fitting itself, during operation used in aggressive process environments which contain, for example acids, halogens, such as chlorine and fluorine, etc., represent a weak point regarding the service life of the cell even if the entire cell is substantially comprised of a corrosion-resistant ceramic. In the assembled state the measuring cell includes extremely small voids exposed to the process gases, which voids are offset in the form of labyrinths and accessibility to the regions where the joining sites of the parts are located entails significant difficulty. Coverage of such regions in such small and difficult to access voids through a suitable coating also appears scarcely possible, especially since during the coating the particles would have to be guided around edges and corners of this labyrinth.

SUMMARY OF THE INVENTION

The invention consequently addresses the problem of eliminating the disadvantages of prior art. The invention in particular addresses the problem of further improving the corrosion resistance of ceramic vacuum measuring cells with diaphragms, especially against acid-containing and/or halogen-containing aggressive vacuum processes, such as are employed in particular in the semiconductor production. The measuring cell should, in addition, be economically producible.

The problem is solved in the vacuum measuring cell according to the invention.

The capacitive vacuum measuring cell according to the invention is produced entirely of a ceramic, such as in particular $Al_2O_3$, and/or at least parts thereof of sapphire. Thereby very high corrosion resistance and long-lasting reproducibility are attained. In regions, in which sealing and joining is necessary or where leadthroughs or measuring connections are provided, small quantities of aluminum are disposed between the aluminum oxide ceramic parts and the two parts are joined under increased temperature and increased pressure in the presence of a protective gas atmosphere which contains a reducing gas, such as hydrogen. Thereby a strong connection is formed. In a further, subsequent step the still remaining metallic aluminum in the connection region is further oxidized to aluminum oxide, preferably oxidized throughout at increased temperature in an oxygen-containing atmosphere. Hereby is attained that the connection region itself is substantially comprised of the same material, namely aluminum oxide, as are the parts to be connected themselves. Very high corrosion resistance, in particular in regions exposed to aggressive process gases, is hereby attained. Compared to the glass solder utilized until now for such measuring cells, the corrosion resistance is significantly increased. A further important advantage is the fact that the connection is mechanically very strong and, in the event of a fracture, not only the connection site breaks open but rather this fracture extends up into the parts to be connected. This leads to a robust measuring cell with high measuring precision and reproducibility of the vacuum pressure measurement with a long service life of the measuring cell.

A preferred implementation of the cell comprises a first plate-shaped housing body preferably with a raised margin, across which a diaphragm is disposed sealed in the margin region such that it encloses a reference vacuum chamber. On the side facing away from the reference vacuum chamber, also closed in the margin region under sealing, a second housing body is disposed at a spacing such that here a measuring vacuum chamber is formed. This measuring vacuum chamber is provided with a connection for the inlet of the medium to be measured.

In the embodiment as a capacitive measuring cell arrangement the surfaces of the first housing body and of the diaphragm, which form the reference vacuum chamber, are coated to be electrically conducting, for example with gold, and thereby form the electrodes of the capacitance measuring cell. The electrodes, in turn, are carried out, for example through the first housing body or through the sealing region in the margin zone. The electrode faces disposed substantially parallel have a distance from one another in the range from 2 μm to 50 μm. The sealing of the diaphragm in the margin regions against the two housings takes place using the joining method according to the invention. Such a capacitive measuring cell arrangement is described in EP 1 070 239 B1 which forms an integral part of the present application.

In the embodiment of an optically readable measuring cell, instead of the capacitive arrangement, light, preferably laser light, is coupled into the diaphragm via a window on the housing body and here reflected back, such that a Fabry-Perot arrangement is formed and the deflection of the diaphragm is measured with the aid of an interference spectrometer. Such an optical measuring cell arrangement is described in the U.S. application Ser. No. 11/497,226, which forms an integral part of the present application. The window here is with advantage formed of sapphire or the housing body itself can be formed of sapphire. Under very high requirements the diaphragm itself can also be formed of sapphire. The use of sapphire permits a further increase of the corrosion resistance.

According to a further implementation of the invention the diaphragm measuring cell is covered with a layer, preferably within the measuring vacuum chamber and preferably the connection region overlapping with the ceramic parts, which layer, on the one hand, has additionally a sealing effect of the connection site and, additionally, as a protective layer, can also have corrosion-resistant properties, depending on the selection of the material. At economical production, said aluminum joining method has a limited vacuum tightness, in the range of $10^{-4}$ mbar L/s up to $10^{-7}$ mbar L/s, preferably better than $10^{-7}$ mbar L/s. When measuring cells with very high measuring sensitivity and for very low pressures to be measured with leakage rates in the range of less than $10^{-8}$ or even $10^{-9}$ mbar L/s are to be produced, said additional sealing of the connection region is advantageous.

Sealing can be done in the region of the side facing away of the process gas or in the exposed region of the process gas. This can thus be located within or outside of the measuring cell depending on the desired embodiment. A good feasibility includes covering the connection site with a glass solder and therewith seal it additionally. In the case of corrosion-resistant connections it is advantageous to apply the glass solder on the side facing away from the process. However, other suitable coatings can also be utilized for this purpose, such as are produced, for example using vacuum processes. An especially suitable coating method is here the ALD method.

ALD is the abbreviation of Atomic Layer Deposition and is defined as follows: The atomic layer deposition (ALD) is a technique of coating out of the gas phase, in which the gaseous reactants are conducted into a vacuum chamber. The essential difference between ALD and CVD (Chemical Vapor Deposition) is that in ALD the layer growth takes place cyclically by means of self-saturating surface reactions. Essentially one atomic layer after the other is thereby generated and the layer is built up. This property is attained through the suitable selection of the process conditions, in particular of the reactants.

The ALD method is especially well suited when corrosion-resistant layers are to be deposited in interior volumes difficult of access, thus, within a completely assembled measuring cell of the previously described type. In this case coating is carried out with a corrosion-resistant metal oxide using the ALD method in the assembled state through the aperture of the measuring connection of the measuring cell. The inner wall of the measuring vacuum chamber, thus the diaphragm and the housing body, as well as the aperture region with the connection means, are hereby covered with a protective layer. At least the connection region between diaphragm and housing body should be covered. However, preferably the connection region of the connection means for the measuring connection is simultaneously also covered. If the measuring connection itself is comprised of a low-corrosion resistant material, such as a metal, the inlet bore should also be adequately covered by carrying out the ALD coating directly through this aperture and also become effective on its walls. Such a protective coating is described in CH 01817/06 by the present applicant. This patent application is declared to be an integral part of the present application.

A growth cycle comprises, for example, four steps in a reaction chamber with the measuring cells placed therein:

1. Introduction of the first precursor gas (for example TMA)

2. Evacuation, purging of the reaction chamber (for example $N_2$)

3. Introduction of the second precursor gas (for example $H_2O$)

4. Evacuation, purging of the reaction chamber (for example $N_2$)

This cycle is repeated until the desired film thickness has bee reached. Depending on the method and the reactor, a cycle lasts between 0.5 and a few seconds, wherein per cycle 0.1 to 3 Å of film material are generated. (For example, in a highly suitable arrangement 0.95 Å per cycle was generated and measured for $Al_2O_3$).

In favorable cases each action step runs to completion, i.e., the precursor molecules chemisorb or react with the surface groups until the surface is as much as possible completely coated. Subsequently no further adsorption takes place. Under these reaction conditions, layer growth is self-controlling, i.e. the quantity of the layer material deposited in each reaction cycle is constant. The layer thickness depends only on the number of reaction cycles permitting exact and simple control. This definition and terminology refers to U.S. Pat. No. 4,058,430 by T. Suntola and to Mikko Ritala, Atomic Layer Deposition, Fundamental and Technological Aspects of High-k Gate Dielectrics, Ed. M. Houssa, Institute of Physics Publishing, Bristol (2004), p. 17.

The various features of novelty which characterize the invention are pointed out with particularity in the claims annexed to and forming a part of this disclosure and are entirely based on International Patent Application PCT/CH2008/000132 filed Mar. 25, 2008 and incorporated here by reference, and which claims priority on Swiss application no. 577/07 filed Apr. 7, 2007, which priority claim is repeated here.

BRIEF DESCRIPTION OF THE DRAWINGS

The invention will be described in the following schematically and by example in conjunction with Figures.

In the drawing depict.

DESCRIPTION OF THE PREFERRED EMBODIMENT

Figure 1:
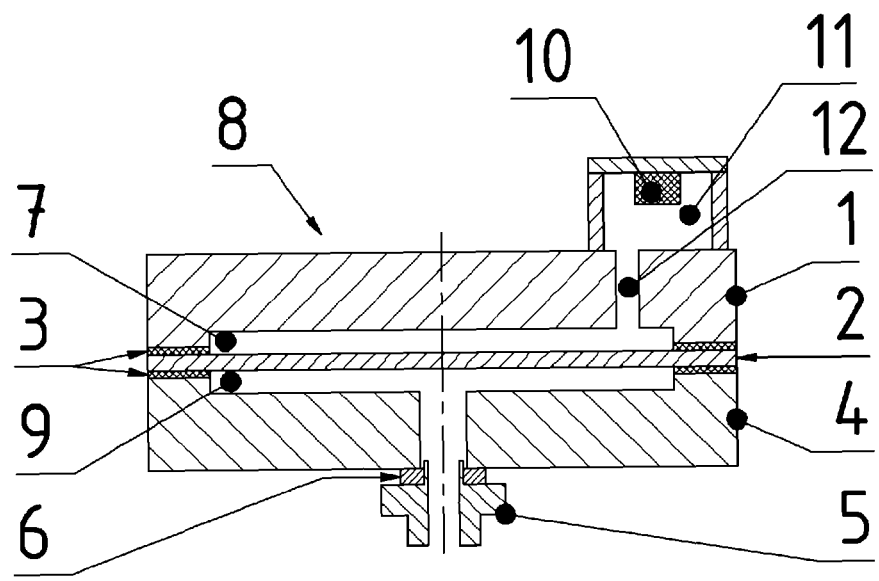
FIG. 1 schematically and in cross section a capacitive diaphragm vacuum measuring cell comprised of ceramic, FIG. 2 schematically and in cross section a vacuum measuring cell according to FIG. 1 with an additional protective coating for the improved sealing of the connection regions, FIG. 3 schematically and in cross section a vacuum measuring cell according to FIG. 1 with an additional covering with a material only in the connection region for the improved sealing of the connection regions.

A known capacitive measuring cell 8 of $Al_2O_3$ with a structure substantially entirely built symmetrically around the diaphragm is shown in cross section in FIG. 1. The first housing body 1 is comprised of a ceramic plate, preferably of $Al_2O_3$, which is joined at a distance of 2 μm to 50 μm opposite the ceramic diaphragm 2, forming a seal in the margin region enclosing a reference vacuum chamber 7. The distance between the two faces, as a rule, is set directly during the mounting via the sealing material 3 or through a step-shaped margin on one or on both bodies, which is located between the diaphragm margin and the housing margin. In the same manner, with a second housing body 4 on the opposite diaphragm side a measuring vacuum chamber 9 is formed, which can be reached by the media to be measured via connection means 5 through an opening in the second housing body 4. The connection means can be implemented as a connection fitting with a connection line or as a tube and is connected with joining means 6 with the second housing body 4 under sealing. These can be comprised of a suitable metal, such as Vacon, or preferably also of a corrosion-resistant ceramic as the measuring cell 8 with the two housing bodies 1, 4 and the diaphragm 2.

The thickness of the sealing means 3 on both sides of the diaphragm 2, as stated, can determine the distance of the two housing bodies 1, 4. However, it is additionally feasible to implement steps on the housing body 1, 4 in the region of the sealing means 3, in order to establish additionally the distance together with the sealing means 3. The sealing means 3 was previously comprised of a glass solder. The sealing means 3 is now formed according to the present method according to the invention of aluminum and is substantially converted to aluminum oxide and is thus substantially identical to the material of the connected ceramic parts. This leads subsequently also in the critical joining region 3 to very high corrosion resistance which corresponds to the aluminum oxide of the measuring cell structure. Other connection regions at which connections become necessary on ceramic parts, such as, for example, a getter housing to be mounted on the measuring cell, a connection fitting or other structural parts, can advantageously be produced using the joining method introduced here.

In a typical measuring cell having an outer diameter of 38 mm and a free inner diaphragm diameter of 30 mm, the distance 3 is approximately 2 to 50 μm, preferably 8 to 37 μm. The first housing body 1 is herein, for example, 5 mm thick, the second housing body 4, 3 mm thick. The second housing body 4 is preferably provided in the interior region with an approximately 0.5 mm deep recess to form a step in order to enlarge the measuring vacuum chamber 9. Diaphragm 2 and housing 1 are each coated with an electrically conducting layer on the reference vacuum chamber side, for example, for the formation of a capacitive measuring cell 8. The two layers are not electrically connected with one another and thereby form a capacitor arrangement. The layers can, for example, be painted, printed or sprayed on or be applied using a vacuum method. They are preferably applied using a vacuum method, such as vapor deposition or sputtering. Gold is especially suitable as the layer material which is vapor-deposited, for example, at a layer thickness of 1 μm, and is subsequently thinned, for example by means of sputter etching, to a few nanometers, for example 5 nm. The layer thickness can thereby be defined and be adjusted to sufficient thickness and tension-free. The electric connections of the conducting layers are preferably completed with vacuum-tight, electrically conducting leadthroughs, preferably through the housing body 1, where they can subsequently be connected to the electronic evaluation circuitry.

To be able to maintain a reference vacuum in chamber 7 which is stable over the long term, a getter 10 is provided. This getter is preferably a non-vaporizable getter in order to keep the reference vacuum chamber 7 free of vaporizing particles. On the first housing body 1, for example, a getter chamber 11 is provided to contain the getter 10, which is connected with the reference vacuum chamber 7 via a connection line 12 or pumping line. The getter chamber 11 can also be set onto the housing body 1, however, it is advantageously set into the housing 1. When the reference vacuum chamber 7 is pumped down via the pumping line 12, the getter chamber 11 is connected with a pumping device. While being pumped down, the getter 10 is heated such that the getter is activated and simultaneously degassed. After activation of the getter 10, the getter chamber 11 is closed on the housing under sealing during the pumping-down.

Structured similarly is also an optically readable diaphragm measuring cell 8. In this case no capacitor coatings are required. On the first housing body 1 in the central region an optically transparent window is disposed via which, preferably with optical fiber, light, preferably laser light, is coupled in and conducted to the diaphragm surface. The latter is coated with a reflecting coating to reflect back the light. On the housing window, additionally, a partially reflecting minor can be disposed. This configuration permits the interferometric evaluation of the diaphragm deflection with the aid of a Fabry-Perot interferometer. The optical window is preferably comprised of sapphire and is set into the first housing body 1 and connected here, according to the method according to the invention, vacuum-tight with sealing means 3.

However, the first housing body 1 can also be produced entirely of sapphire. The diaphragm measuring cells, in particular the two housing bodies and the diaphragm, are implemented of a metal oxide or a ceramic in order to attain high corrosion resistance. Preferably used is herein an aluminum oxide ($Al_2O_3$). The alpha-modification of the aluminum oxide is preferred. Highly especially preferred is the aluminum oxide sapphire modification. Different modifications can be combined. For example, a conventional aluminum oxide for the first housing body 1 can be combined with a sapphire window; or the diaphragm 2 can also be of sapphire and the housing bodies can be comprised of simpler modifications of aluminum oxide. Implementation of the diaphragm 2 of sapphire has special advantages with respect to thermal behavior and greater elasticity is attained. Greater deflections can thereby be permitted whereby the measuring range is expanded. The connection means 5 itself is advantageously also fabricated of such aluminum oxide materials.

The joining means 3, 6, like those of the housing bodies 1, 4 with the diaphragm 2, of the connection means 5 with the second housing body 4 and of the getter chamber 11 with the first housing body 1, are conventionally established, for example using a glass solder or also an active solder such as, for example, TiCuAg if, for example, ceramic materials are to be connected with metallic materials.

It has been found that the joining sites with the joining means 3, 6 which are exposed to the process environment to be measured, determine and restrict the corrosion resistance and therewith the service life of the measuring cell 8, although, for example, a glass solder per se has good properties in this regard.

By proceeding according to the joining method introduced here for ceramic parts, the joining site 3 can additionally be significantly improved with respect to corrosion resistance. The joining thereby becomes moreover mechanically more stable. The two ceramic parts to be joined, thus for example the diaphragm 2, the housing plate 1 or housing plate 2, are comprised of an aluminum oxide ceramic. In principle, all crystal forms or modifications of an aluminum oxide ceramic are herein utilizable. Suitable are, for example, the forms alpha, gamma and sapphire modification as well as also these forms in their combined application. In the region to be joined the surface roughness is set to less than 500 nm, for example through additional grinding or polishing. The faces to be joined of the ceramic parts are advantageously substantially planar and must at least be aligned with one another. The purity of the ceramics to utilize have a value of better than 99%, wherein the purity is preferably better than 99.5%. When using the modification sapphire as a ceramic part, for example for diaphragm 2, the surface roughness should advantageously be better than 20 nm. Before the joining process the ceramic parts to be joined are to advantage cleaned of foreign materials at least in the region of the surface to be joined. Suitable for this purpose are cleaning methods such as plasma etching, ion etching or chemical etching of the surfaces. Chemical cleaning or etching, as is conventionally used in the semiconductor industry, is especially suitable, since these methods have been carried out industrially for a long time and can be handled cost-effectively. For a first chemical cleaning step are suitable aqueous solutions containing nitric acid ($HNO_3$) at a concentration in the range from 10 to 70%. The parts are treated, for example, for 5 to 60 minutes in such a solution and subsequently rinsed with water. If necessary, a second treatment with the same solution can be performed at increased temperature up to 100° C., again approximately in the same time frame and the parts are subsequently again rinsed with water. For very good cleaning results, a further cleaning step can additionally be carried out by treating the parts in an aqueous solution of hydrofluoric acid (HF) at a concentration in the range from 5 to 50%. The cleaning takes herein place for approximately one half minute up to five minutes. The parts are subsequently rinsed again with water and dried. They can be dried at atmospheric pressure, for example under hot clean air, or, if especially clean conditions are desired, also under protective gas or even under vacuum.

In the region of the faces to be joined of the two ceramic parts, metallic aluminum is subsequently disposed. The aluminum can be deposited onto the surface of one or both parts using, for example, a vacuum method. A suitable vacuum method is the sputtering process. The layer thickness of the deposited aluminum should herein be in the range from 0.2 to 15 μm, preferably in the range from 0.5 to 6 μm. However, it is also possible to simply place an aluminum foil between the parts to be joined. The aluminum foil should in this case have a thickness in the range from 10 to 50 μm or preferably in the range from 10 to 30 μm. The purity of the aluminum to be used should in both cases be better than 99%, preferably better than 99.5%.

The parts to be joined and thus prepared are now transferred into a treatment chamber in which a process gas is contained which encompasses the parts to be joined. The process gas is comprised of an inert carrier gas including a reduction gas. As the inert gas can be utilized gases such as argon, nitrogen, helium, etc. or their mixtures. Hydrogen is advantageously used as the reduction gas at a fraction in the range from 1 to 20% or advantageously in the range from 1 to 10%. The joining process now takes place by bringing the parts to a temperature of 600 to 680° C. and pressing the ceramic parts together under pressure. The pressing force necessary for this purpose is herein in the range from 1 $N/mm^2$ to 40 $N/mm^2$, preferably in the range from 3 $N/mm^2$ to 20 $N/mm^2$. The process duration of this joining step is in the range from 30 to 90 minutes. After this joining step the entire joined part is advantageously cleaned again, according to the procedure described before, by plasma etching, ion etching or in particular by chemical cleaning.

To attain the very high corrosion resistances, demanded also in the region of the generated joining, of said diaphragm vacuum measuring cells, it is advantageously subjected to a further method step in which the joining region is additionally post-oxidized such that potentially remaining, not completely oxidized aluminum in the connection region and in particular in its surface region which is exposed to the aggressive process gas to be measured, is post-oxidized. For that purpose the joined parts or the assembled measuring cells as a whole is again transferred into a process chamber containing an oxidizing gas. This gas can be a mixture of inert gases, as previously described, with a fraction of oxygen. The process gas herein can also be comprised of 100% pure oxygen. In order to attain the high quality of the aluminum oxide to be formed, an oxygen purity of better than 99.0% is advantageously utilized. This oxidation process is carried out at increased temperature as tempering under oxygen action within a temperature range from 450 to 575° C.

The length of treatment is in the range from 2.0 to 12 hours, preferably in the range from 6.0 to 10 hours.

In certain cases it can additionally be useful if, before the joining process, on at least one of the surfaces of the ceramic parts 1, 2, 4, to be joined an adhesion promoting metallic layer is deposited. Suitable herein is in particular one of the metals chromium or titanium, wherein titanium is especially suitable with respect to corrosion resistance. Such layers are also deposited using suitable and known vacuum methods at layer thicknesses in the range from 10 to 100 nm.

The operating points within said operating ranges can be selected and set for the joining method such that a joining strength with shearing strengths in the range from 5 to 35 $N/mm^2$ can be set or even in the range from 14 to 42 $N/mm^2$. Consequently the joining is so strong that with a fracture of the joining the fracture line does not occur solely through the joining interphase but rather extends to a major extent within the joined parts.

Said joining method is not only suitable for joining housing parts 1, 4 with a ceramic diaphragm 2, but rather also for other parts on a diaphragm measuring cell 8 to be joined, such as, for example, for a connection fitting 5 or for a getter housing.

Figure 2:
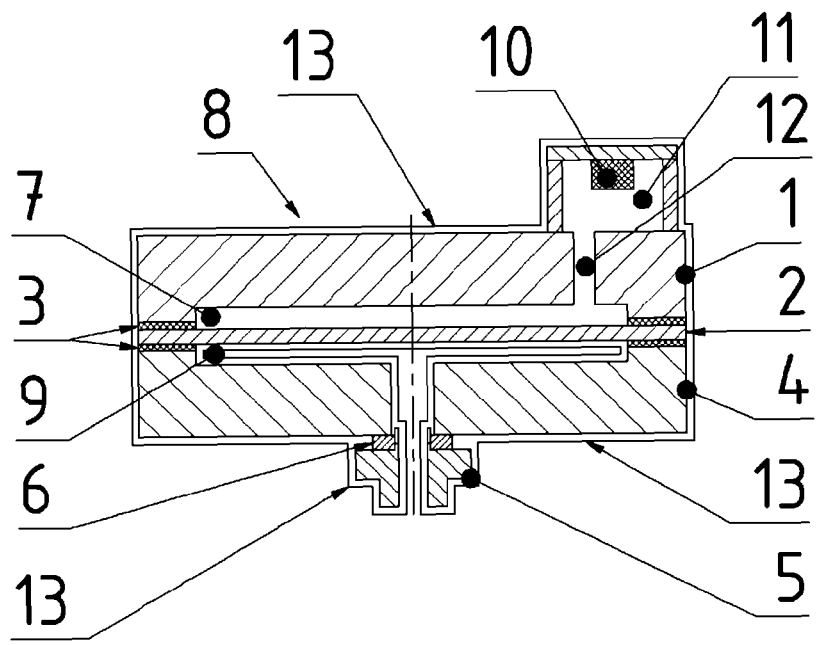

It has been found that with the aid of an additional layer 13, which acts as a sealing means and as a protective layer and covers at least these joining regions, as is shown schematically and by example in FIG. 2, the vacuum tightness of the measuring cell 8 can be additionally improved. Therewith specifically a further improvement of the chemical resistance against aggressive process gases can be improved, which leads to a further extension of the service life of the measuring cell. In addition, it becomes therewith possible to cover protectively other less corrosion-resistant materials and thereby be able to use them nevertheless, such as for example in the joining region of the cell. This permits a greater degree of constructional freedom and better adaptation to the application conditions.

Deposition of such a protective layer 13 for an additional sealing of the joining sites is advantageously realized using an ALD coating method. Preferred are the materials $TiO_2$, $Ta_2O_5$ or also $Al_2O_3$ which are deposited out of the gas phase in the ALD method. A deposited layer of $Al_2O_3$ can herein be generated more densely than the joined ceramic structure alone and thus can increase the vacuum tightness additionally. For the ALD protective layer preferably a thickness of 20 to 200 nm is selected. This layer should especially cover the joining region of the joined ceramic parts. The ALD method makes reliably possible the controlled deposition in extremely small voids even around structures resembling labyrinths. The deposition can therefore be carried out on the completely assembled measuring cell.

Figure 3:
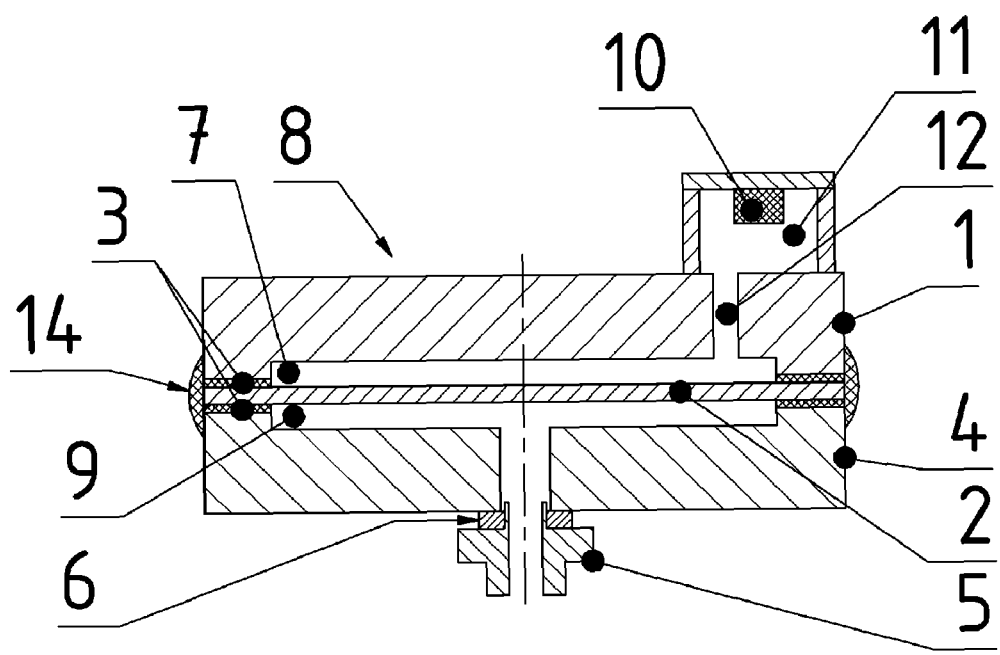

In the case of lower requirements, in particular with respect to corrosion resistance, the joining region can also be covered with a material 14, preferably a glass solder, which overlaps the joined parts at sites as shown in FIG. 3 schematically and by example. This additional covering 14 permits the improved sealing of the joining region 3, 6, and serves as additional sealing means 14. This means is preferably disposed on the outer surface of the measuring cell 8 forming a seal and is preferably a glass solder. It is sufficient to utilize this material 14 only in the joining region, thus to cover the measuring cell 8 only partially.

The invention claimed is:

1. A method for the production of a vacuum measuring cell (8) for measuring a medium, the vacuum measuring cell comprising first and second housing plates (1, 4) and a diaphragm (2) for functioning as a pressure transducer, one side of the diaphragm (2) being spaced apart from a portion of the first housing plate (1) around a margin region of the first housing plate that is engaged against a margin region of the diaphragm in a first joining region by joining means (3) forming a seal, so that between the margin regions of the first housing plate and the diaphragm, a reference vacuum chamber (7) is formed, an opposite side of the diaphragm (2) being spaced apart from a portion of the second housing plate (4) around a margin region of the second housing plate that is engaged against the margin region of the diaphragm in a second joining region by joining means (3) forming a seal, so that between the margin region of the second housing plate and the diaphragm, a measuring vacuum chamber (9) is formed, the second housing plate (4) including an opening for communicating the measuring vacuum chamber (9) to the medium, the vacuum measuring cell including connection means (5) with joining means (6) connected to the second housing part for forming a seal for joining the measuring vacuum chamber (9) with the medium to be measured in a third joining region, wherein at least the diaphragm (2) and the two housing plates (1, 4) are ceramic parts (1, 2, 4) of an aluminum oxide, the method comprising: forming at least one of the joining means (3, 6) of metallic aluminum having a thickness in the range of 0.5 μm to 30 μm; disposing the at least one joining means in one of the joining regions between the ceramic parts (1, 2, 4); and joining the ceramic parts by pressing the ceramic parts (1, 2, 4) to be joined together at increased temperature in the range of 600° C. to 680° C. in a process gas atmosphere encompassing the parts to be joined, the process gas atmosphere including a reducing gas, and the pressing occurring during a time in the range of 30 to 90 minutes; and subsequently to the pressing step, performing a tempering step in a second process gas atmosphere which includes oxygen, wherein the tempering step takes place in a temperature range of 450° C. to 575° C. so that the metallic aluminum is substantially oxidized to aluminum oxide.

2. The method as claimed in claim 1, wherein each ceramic part comprises one of an alpha and gamma aluminum oxide.

3. The method as claimed in claim 1, wherein surfaces to be joined of the ceramic parts (1, 2, 4) have a mean surface roughness of less than 500 nm.

4. The method as claimed in claim 1, wherein the tempering is performed for a time in the range from 2.0 to 12 hours.

5. The method as claimed in claim 1, including cleaning at least surfaces of the ceramic parts (1, 2, 4) to be joined of foreign material before the joining step.

6. The method as claimed in claim 5, wherein the cleaning step is a chemical cleaning step carried out using a solution containing $HNO_3$.

7. The method as claimed in claim 1, wherein the ceramic parts (1, 2, 4) have a purity of better than 99%.

8. The method as claimed in claim 1, including depositing an adhesion promoting metallic layer on at least one of the surfaces of the ceramic parts (1, 2, 4) to be joined.

9. The method as claimed in claim 1, including the joining means of metallic aluminum (3, 6) being deposited as a layer on at least one of the surfaces of the ceramic parts (1, 2, 4) to be joined.

10. The method as claimed in claim 8, wherein the adhesion promoting metallic layer has a thickness in the range of 0.2 μm to 15 μm.

11. The method as claimed in claim 1, wherein, as the joining means (3, 6), a foil of aluminum is utilized with a thickness in the range of 10 μm to 50 μm.

12. The method as claimed in claim 1, wherein the joining step is performed with a shearing strength in the range of 5 $N/mm^2$ to 35 $N/mm^2$.

13. The method as claimed in claim 1, wherein, after the joining step, in a further step at least in the joining regions, an additional layer (13) is deposited as a vacuum tightening means, which covers and overlaps the joining regions and at least one subregion of the joined ceramic parts (1, 2, 4).

14. The method as claimed in claim 1, including applying, as a sealing means (13) around the cell, a glass solder.

15. The method as claimed in claim 1, including applying an additional covering (14) for improved sealing with a material only in the joining region as additional sealing means (14), wherein such covering is only applied on an outer surface of the measuring cell (8) forming the seal at the margin region of the diaphragm.

16. The method as claimed in claim 1, wherein the vacuum measuring cell (8) comprises a capacitive diaphragm measuring cell.

17. The method as claimed in claim 1, wherein the vacuum measuring cell (8) comprises an optically readable diaphragm measuring cell.

18. The method as claimed in claim 1, wherein the ceramic parts each at least partly comprise sapphire and have different shapes.

19. The method as claimed in claim 1, wherein surfaces of the ceramic parts (1, 2, 4) to be joined have a mean surface roughness of less than 500 nm and are planar.

20. The method as claimed in claim 1, wherein the tempering is performed for a time in the range from 6.0 to 10 hours.

21. The method as claimed in claim 1, wherein at least the surfaces of the ceramic parts (1, 2, 4) to be joined are cleaned of foreign material before the joining process, through at least one of: chemical etching; plasma etching; and ion etching.

22. The method as claimed in claim 5, including a further treatment step carried out using a solution containing HF on the surfaces of the ceramic parts (1, 2, 4) to be joined.

23. The method as claimed in claim 1, wherein the ceramic parts (1, 2, 4) have a purity of better than 99.5%.

24. The method as claimed in claim 1, including depositing an adhesion promoting metallic layer on at least one of the surfaces of the ceramic parts (1, 2, 4) to be joined which comprises at least one of Ti and Cr.

25. The method as claimed in claim 1, including the joining means of metallic aluminum (3, 6) being deposited as a layer on at least one of the surfaces of the ceramic parts (1, 2, 4) to be joined using a vacuum process comprising sputtering.

26. The method as claimed in claim 8, wherein the adhesion promoting metallic layer has a thickness in the range of 0.5 µm to 6.0 µm.

27. The method as claimed in claim 1, wherein, as the joining means (3, 6), a foil of aluminum is utilized with a thickness in the range of 10 µm to 30 µm.

28. The method as claimed in claim 1, wherein the joining step is performed with a shearing strength in the range of 14 $N/mm^2$ to 42 $N/mm^2$.

29. The method as claimed in claim 1, including applying, as a sealing means (13) around the cell, a glass solder in the form of a layer deposited using an ALD method.

30. The method as claimed in claim 1, including applying an additional covering (14) for improved sealing with a material only in the joining region as additional sealing means (14), wherein said covering is only applied on an outer surface of the measuring cell (8) forming the seal at the margin region of the diaphragm, the additional covering (14) being a glass solder.

* * * * *